United States Patent
Selli

(10) Patent No.: US 6,885,949 B2
(45) Date of Patent: Apr. 26, 2005

(54) SYSTEM AND METHOD FOR MEASURING SYSTEM PARAMETERS AND PROCESS VARIABLES USING MULTIPLE SENSORS WHICH ARE ISOLATED BY AN INTRINSICALLY SAFE BARRIER

(75) Inventor: Basilio Selli, Nesconset, NY (US)

(73) Assignee: Smar Research Corporation, Holbrook, NY (US)

( * ) Notice: Subject to any disclaimer, the term of this patent is extended or adjusted under 35 U.S.C. 154(b) by 151 days.

(21) Appl. No.: 10/202,345

(22) Filed: Jul. 24, 2002

(65) Prior Publication Data
US 2004/0019440 A1 Jan. 29, 2004

(51) Int. Cl.⁷ ............................................... H05B 9/02
(52) U.S. Cl. ........................................ 702/57; 700/79
(58) Field of Search ..................... 700/79; 361/55–57, 361/90, 103–104; 702/57, 58

(56) References Cited

U.S. PATENT DOCUMENTS

| 4,211,113 A | 7/1980 | Harrison |
| 5,164,607 A | 11/1992 | Weigert et al. |
| 5,305,639 A | 4/1994 | Pontefract |
| 5,828,567 A | 10/1998 | Eryurek et al. |
| 5,876,122 A | 3/1999 | Eryurek |
| 6,021,162 A | 2/2000 | Gaboury et al. |
| 6,065,332 A | 5/2000 | Dominick |

Primary Examiner—Marc S. Hoff
Assistant Examiner—Paul Kim
(74) Attorney, Agent, or Firm—Dorsey & Whitney LLP

(57) ABSTRACT

A system for measuring at least one parameter is provided. The system includes a control logic arrangement powered by a power source, and an intrinsically safe barrier operatively connected to the control logic arrangement, and also powered by the same power source. The intrinsically safe barrier is adapted to be operatively connected to at least one sensor which is also powered by the same power source. The sensor is configured to communicate data representing a parameter to the control logic arrangement via the intrinsically safe barrier. In one embodiment, the control logic arrangement, the intrinsically safe barrier and the sensor are galvonically isolated from external components and/or provided in one enclosure.

68 Claims, 6 Drawing Sheets

SYSTEM AND METHOD FOR MEASURING SYSTEM PARAMETERS AND PROCESS VARIABLES USING MULTIPLE SENSORS WHICH ARE ISOLATED BY AN INTRINSICALLY SAFE BARRIER

FIELD OF THE INVENTION

The present invention relates generally to systems and methods for measuring parameters and process variables within a manufacturing environment and more particularly relates a system and method to measuring parameters and process variables within a hazardous environment in which intrinsically safe barriers are utilized.

BACKGROUND OF THE INVENTION

In industrial processes where flammable or explosive materials are handled any leak or spill can cause an explosive and dangerous atmosphere. These conditions occur in many industrial environments, most typically in those involving petroleum and other chemicals, process gassers, metal and carbon dust, alcohol, grain, starch, flour, and fibers. To protect both personnel and plant, precautions should be taken within these hazardous areas. In the past, pneumatic controls have been used in these environments to avoid the risk of an electrical spark. Currently, while pneumatic equipment is still utilized, new technologies and engineering advances have created a wide range of electrical controls which allow far greater functionality, and still maintain a safe operating environment within such hazardous areas.

Many of these technologies, as they apply to process measurement and control, fall into an area of engineering known as "Intrinsic Safety." Intrinsic Safety methodology describes a placement of an energy-limiting interface electrically between safe and hazardous areas. This energy-limiting interface and placement thereof restricts the electrical energy in the hazardous-area circuits so that potential electrical sparks or hot spots are too limited and weak to cause any ignition. The interface generally passes signals in both directions, but limits the voltage and current that can reach the hazardous area under particular fault conditions.

An intrinsic safety barrier is a device typically placed in a non-hazardous location or a safe location which permits the electrical interconnection of devices located in a hazardous area. In particular, the intrinsically safe barrier limits the power that can be introduced into the hazardous location to energy levels which are safe for the material being handled (or the process being performed) in such area. This barrier protects against, e.g., fault conditions such as shorting of the wires that are connected to the hazardous area side of the barrier by grounding the wires connected to the hazardous area side of such barrier therefore preventing a misconnection or failure of the power supply which allows an unsafe voltage to be applied to the safe area side of the barrier.

In a particular factory within which hazardous conditions exist, a conventional arrangement can be provided that includes intrinsically safe barrier which isolates a portion of the power grid of the factory from an array of sensors located throughout the factory. The sensors are located throughout the hazardous area of the factory. Each of the sensors is connected to the intrinsically safe barrier in order to receive power, and directly coupled to a computer processing system-via a communication link at the safe side of the barrier so as to communicate data and readings of the sensors thereto. In particular, this computer processing system receives the readings from each of the sensors of the sensor array through the associated communications link. While this system can be adequately used for measuring process parameters and variables throughout the factory, certain connections should be made between each of the sensors and the intrinsically safe barrier.

Certain publications relate to devices and systems utilizing particular barriers and safety devices. For example, U.S. Pat. No. 5,164,607 describes a fill sensor for a paint gun which provides a light sensor opposing a light source in a housing surrounding a transparent portion of a paint gun overflow line. An electric circuit is connected to an intrinsically safe barrier, and is adapted to operate through the intrinsically safe barrier for use in a manufacturing environment. The electric circuit senses whether there is paint in the overflow line. The electric circuit is electrically energized through the intrinsically safe barrier. The other side of the intrinsically safe barrier is connected to the relay. The relay may be any switch responsive to a predetermined electrical current, and provides an electrical isolation between the activating current carrying elements and the switched elements. The relay is responsive to the electrical circuit, and informs a user when a predetermined condition is sensed by the electrical circuit.

Another publication, i.e., U.S. Pat. No. 5,305,639, describes a liquid petroleum gas (LPG) gauge sensor unit that fits between the units of existing magnetically-coupled LPG gauge, and includes a magnetic field sensing switch, a mechanism to variably position the switch and an intermediate magnet. Upon sensing a particular orientation, the LPG gauge sensor transmits an indicative signal to an intrinsically safe barrier unit through cables and a waterproof junction box. The intrinsically safe barrier limits the power supplied to LPG gauge sensor. The indicative signal is sent to a fuel reordering system via another cable, and the fuel reordering system can then transmit a message to the distributor based on the particular orientation sensed by the LPG gauge sensor.

Furthermore, U.S. Pat. No. 6,021,162 describes a method and apparatus for decoding an encoded signal. The transmitter, as described in this publication, includes measurement circuitry and sensor circuitry. The measurement circuitry and the sensor circuitry are isolated by isolators. An isolation barrier (described in this publication as the isolators) are used to electrically isolate the sensor from the rest of the circuitry within the transmitter, and to prevent harmful electrical discharges. The sensor circuitry senses a process variable, and provides an output signal. The sensor circuitry frequency modulates process variable related signals to be transmitted across one of the isolators. The transmitter can be configured to communicate over a 4–20 mA current, as in the HART® protocol, or may be fully digital communications as in Fieldbus.

Also, U.S. Pat. No. 6,065,332 describes a method and apparatus for sensing and displaying the magnitude of torsional vibrations. As described in this publication, the current sensor senses the current of a motor driving a rotary table. In addition, the current sensor converts the magnetic flux produced by the current passing through the conductors in the power cord into a voltage signal, and delivers this voltage signal to a first intrinsically safe barrier. The signal passes from the first intrinsically safe barrier to a low pass filter, and then to a computer. An A/D converter, which is part of the computer, converts a digital signal that is representative of the voltage signal produced by the current sensor into an analog signal. The analog signal passes through a second barrier before reaching a first display, and then passes through a third intrinsically safe barrier before reaching a second display. The first and second displays provide the operator on a drill floor with information relating to the magnitude of a torsional vibration sensed by the apparatus.

OBJECTS AND SUMMARY OF THE INVENTION

An object of the present invention is to provide a measuring system in which a sensor array can be located in a hazardous area, with the sensors of the sensor array being isolated from control circuitry and a power source by an intrinsically safe barrier, and with the control circuitry and the intrinsically safe barrier being supplied with power from the same power source, and the power source being directly connected to the control circuitry and the intrinsically safe barrier.

Another object of the present invention is to provide a measuring system in which a sensor array can be located in a hazardous area, the sensors of the sensor array may be isolated from control circuitry and power circuitry by an intrinsically safe barrier, and the control circuitry, the power circuitry and the intrinsically safe barrier are each preferably galvanically isolated from exterior circuit elements.

Still another object of the present invention is to provide a measuring system whose sensor array can be located in a hazardous area, such that the sensors of the sensor array are isolated from control circuitry and power circuitry by an intrinsically safe barrier, and the control circuitry, the power circuitry and the intrinsically safe barrier are co-located in an enclosure.

Accordingly, a system and method are provided to address at least some, if not all, of these objects is provided. This system includes a control logic arrangement powered by a power source, and an intrinsically safe barrier operatively connected to the control logic arrangement, and also powered by the same power source. The intrinsically safe barrier is adapted to be operatively connected to at least one sensor which is also powered by the same power source. The sensor is configured to communicate data representing a parameter to the control logic arrangement via the intrinsically safe barrier. The power source is directly connected to the control logic arrangement and the intrinsically safe barrier.

In an exemplary embodiment of the present invention, the system also includes a control interface powered by a further power source. The control interface is configured to receive data representative of the parameter from the control logic arrangement. The control interface may transmit commands to the sensor via the control logic arrangement and/or via the intrinsically safe barrier. Commands can also be forwarded to the sensor via the intrinsically safe barrier.

In another exemplary embodiment of the present invention, the control interface is powered by a further power source. The control interface is configured to receive data representing the parameter from the control logic arrangement, and to transmit commands directly to the sensor. The control logic arrangement can include a transformer having a positive terminal and a negative terminal, a capacitor having a first terminal and a second terminal, and a diode having a cathode and an anode. The anode is electrically connected to the positive terminal of the transformer and the first terminal of the capacitor. The logic arrangement also includes a processor electrically connected to the cathode of the diode, and electrically connected to negative terminal of the transformer and the second terminal of the capacitor. The control logic arrangement can also include a further transformer having a first terminal, a second terminal, a third terminal, and a fourth terminal. Such further transformer can be electrically connected to the processor, and to the processor.

In yet another exemplary embodiment of the present invention, the logic arrangement can also include a control interface electrically connected to the further transformer. The control interface may be configured to receive data representing the parameter from the control logic arrangement, and to the sensor via the control logic arrangement. The data may representing the process parameter received by the control logic arrangement from the sensor is digital data. In addition, such data can be transmitted using a communications protocol (e.g., a Fieldbus protocol).

In still another exemplary embodiment of the present invention, the intrinsically safe barrier electrically isolates the sensor from the control logic arrangement. Also, the intrinsically safe barrier can limit the voltage differential over the sensor to a particular limit (e.g., approximately 18 V). In addition, the intrinsically safe barrier limits the amount of current provided to the sensor to a particular current amount (e.g., approximately 120 mA).

According to a further embodiment of the present invention, the intrinsically safe barrier may include a fuse, a zener diode having a cathode and an anode, and a resistor having a first terminal and a second terminal. The first terminal of the resistor is electrically connected to the cathode of the zener diode and the fuse. The system can include an enclosure, such that the control logic arrangement and the intrinsically safe barrier are located within the enclosure. Also, the control logic arrangement, the intrinsically safe barrier and the sensor may be galvanically isolated from external components.

In a still further exemplary embodiment of the present invention, the intrinsically safe barrier can be adapted to be operatively connected to a second sensor,. The second sensor is powered by the power source, and configured to transmit data representing a further parameter via the intrinsically safe barrier to the control logic arrangement. The data representative of the second parameter received by the control logic arrangement from the second sensor is digital data which can be transmitted using a communications protocol (e.g., a Fieldbus protocol).

BRIEF DESCRIPTION OF THE DRAWINGS

Further objects, features and advantages of the invention will become apparent from the following detailed description taken in conjunction with the accompanying figures showing illustrative embodiments of the invention, in which.

Figure 1:
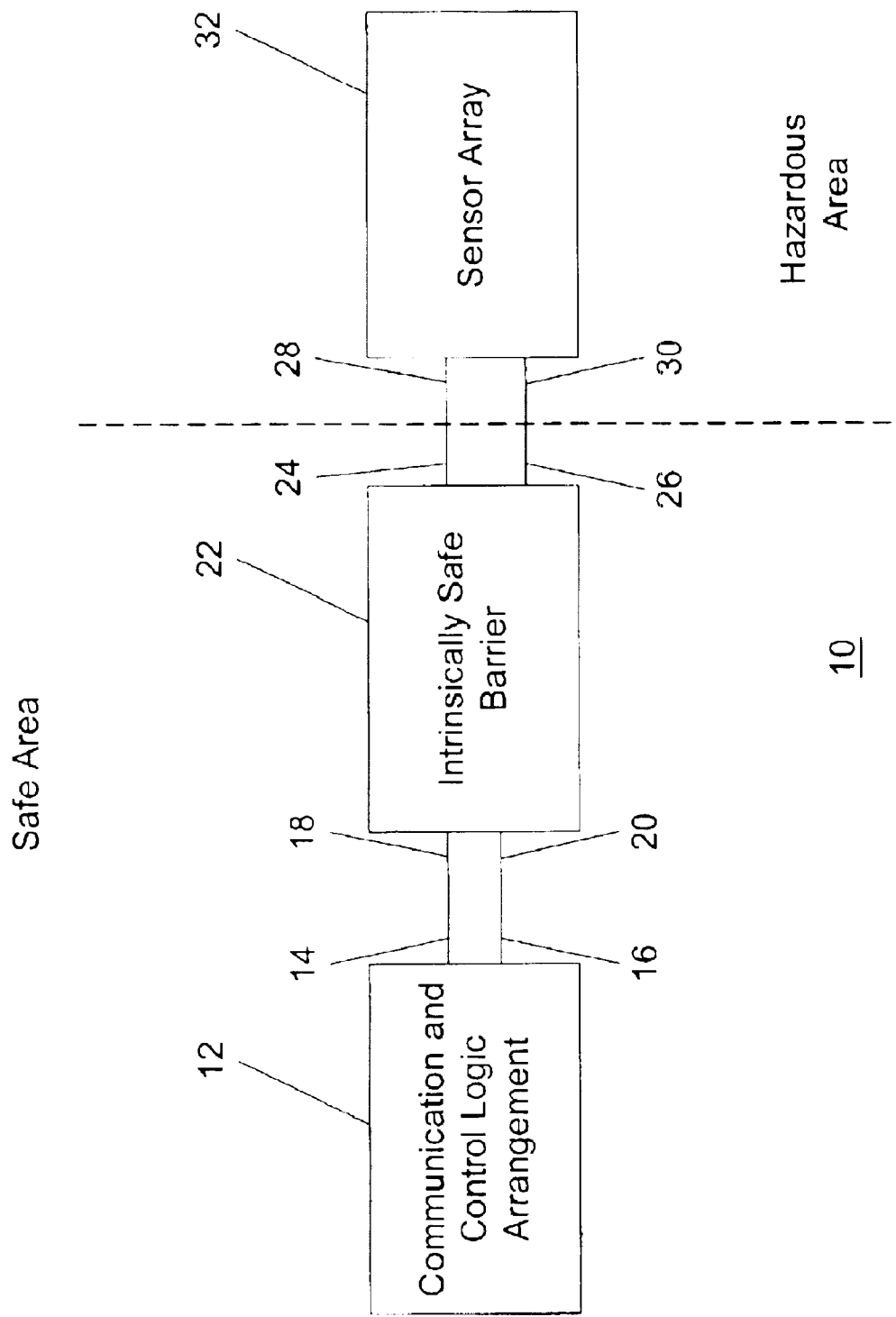
FIG. 1 is a block diagram of a first exemplary embodiment of a measuring system according to the present invention.

Throughout the figures, the same reference numerals and characters, unless otherwise stated, are used to denote like features, elements, components or portions of the illustrated embodiments. Moreover, while the present invention will now be described in detail with reference to the drawings, it is done so in connection with the illustrative embodiments. It is intended that the changes and modifications can be made to the described embodiments without departing from the true scope and spirit of the subject invention as defined by the appended claims.

DETAILED DESCRIPTION OF PREFERRED EMBODIMENTS

FIG. 1 illustrates a block diagram of a first exemplary embodiment of a measuring system 10 for sensing various process parameters and variables according to the present invention. The measuring system 10 utilizes a communication and control logic arrangement 12, an intrinsically safe barrier 22 and a sensor array 32 to measure various process parameters. The communication and control logic arrangement 12 preferably provides power for the entire measuring system 10, issues commands to the sensor array 32, and receives information regarding various process parameters and variables from the sensor array 32. The communication and control logic arrangement 12 also includes a first terminal 14 and a second terminal 16 which are connected to a first terminal 18 and a second terminal 20, respectively, of the intrinsically safe barrier 22. The intrinsically safe barrier 22 electrically isolates and protects a particular area (e.g., a protected area) in which no electric sparks are desired. In the measuring system 10, the sensor array 32 is located in the protected area, and the communication and control logic arrangement 12 and the intrinsically safe barrier 22 are located outside the protected area. The intrinsically safe barrier 22 also includes a third terminal 24 and a fourth terminal 26 which are connected to a first terminal 28 and a second terminal 30, respectively, of the sensor array 32. The sensors of the sensor array 32 measure various process parameters, for example, temperature, pressure, humidity, etc. The various sensors in the sensor array 32 utilize a communications protocol, such as Fieldbus, to transmit a digital representation of the measured parameters to the communication and control logic arrangement 12 through the intrinsically safe barrier 22.

In particular, the intrinsically safe barrier 22 is preferably an electrical system arrangement which is well known to those having ordinary skill in the art of manufacturing. The intrinsically safe barrier 22 electrically isolates and protects that protected area (e.g., a hazardous area) by preventing electrical power from being introduced into the protected area, by e.g., limiting power, current and voltage to certain levels so as to prevent the electric sparks from being generated therein. The sensor array 32 is located in the protected area, and the communication and control logic arrangement 12 and the intrinsically safe barrier 22 are located outside of the protected area.

Figure 2:
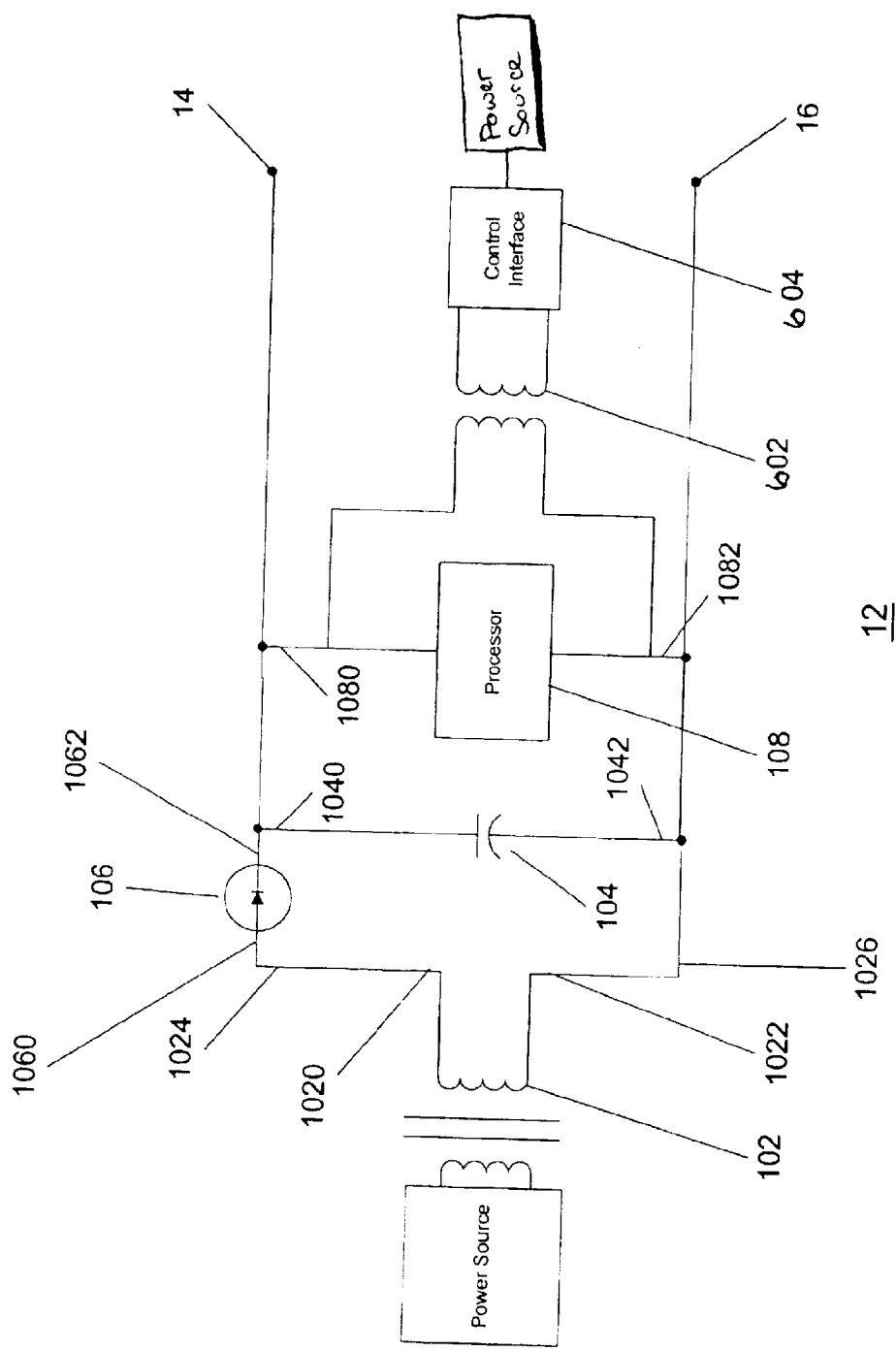
FIG. 2 is a circuit diagram of an exemplary embodiment of a communication and control logic assembly of the measuring system of FIG. 1.

FIG. 2 shows a circuit diagram of an exemplary embodiment providing certain details of the communication and control logic arrangement 12, which includes the first terminal 14, the second terminal 16, a transformer 102, a capacitor 104, a diode 106 and a processor 108. The transformer 102 of the communication and control logic arrangement 12 is preferably a power transformer that provides power to the measuring system 10. A power source or network 120 provides power to the transformer 102 at a first power terminal 1020 and a second power terminal 1022. The transformer 102 also includes a third power terminal 1024 and a fourth power terminal 1026. The third power terminal 1024 of the transformer 102 and an anode 1060 of the diode 106 are electrically interconnected. Also, a cathode 1062 of the diode 106, a first terminal 1040 of the capacitor 104, a first terminal 1080 of the processor 108 and a first terminal 14 of the communication and control logic arrangement 12 are electrically connected to one another. Further, the fourth power terminal 1026 of the transformer 102, a second terminal 1042 of the capacitor 104, a second terminal 1082 of the processor 108, and a second terminal 16 of the communication and control logic arrangement 12 are electrically interconnected. The capacitor 104 preferably acts as a power filtering device for the processor 108 and the intrinsically safe barrier 22 feeding power to the sensor array. In this manner, the capacitor 104 (and the diode 106) can be referred to as a power arrangement which is preferably directly connected to the processor 108 and to the intrinsically safe barrier 22. The communication and control logic arrangement 12 is preferably powered by the transformer 102 and the capacitor 104. In a particular embodiment of the present invention, the transformer 102 provides 18V to the measuring system 10, and the capacitor 104 is a 1 mF capacitor.

The measuring system 10 is designed so that the communication and control logic arrangement 12, while being located physically and electrically outside the protected area, is nevertheless in communication with the various sensors of the sensor array 32 which are located on the opposite side of intrinsically safe barrier 22, and provided within the protected area. The processor 108 transmits commands to these various sensors of the sensor array 32 by utilizing a particular communications protocol and receives commands from the various sensors of the sensor array 32 utilizing a communications protocol which is compliant with the protocol of the sensors. In an exemplary embodiment of the present invention, the communications protocol is Fieldbus. In another certain embodiment, the communications protocol is HART® protocol, PROFIBUS® protocol, etc.

Figure 3:
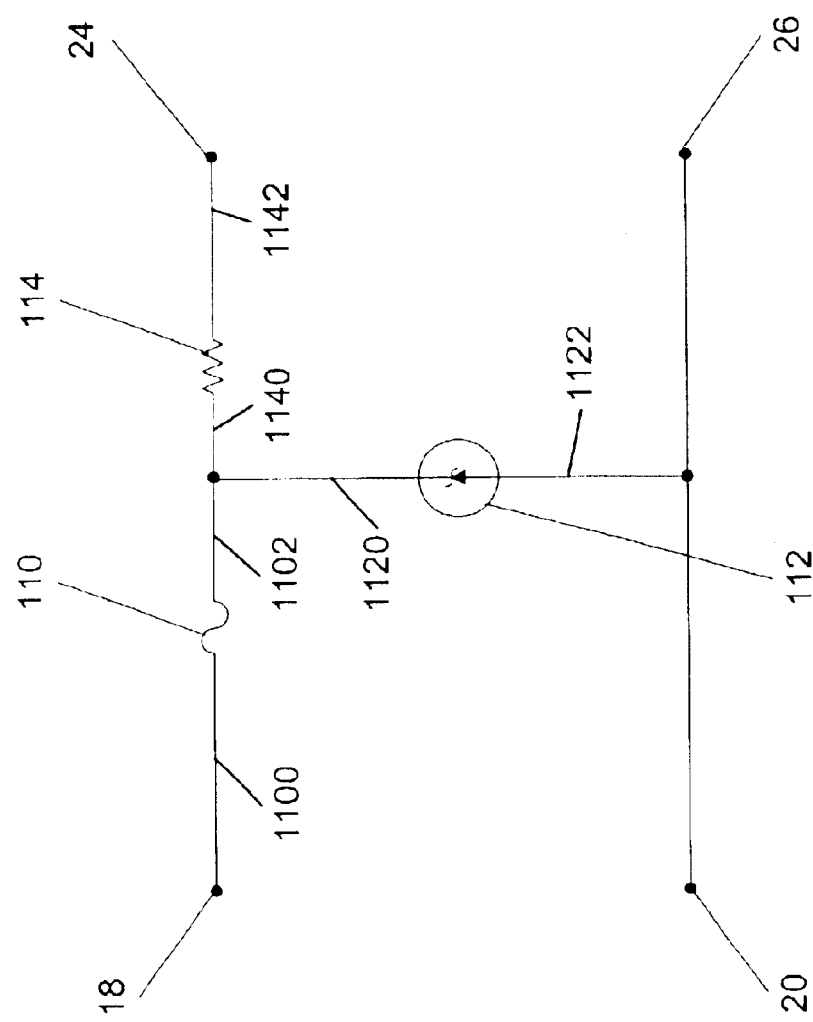
FIG. 3 is a circuit diagram of an exemplary embodiment of an intrinsically safe barrier of the measuring system of FIG. 1.

FIG. 3 shows a circuit diagram of an exemplary embodiment of the intrinsically safe barrier 22 of the measuring system 10 of FIG. 1. This exemplary intrinsically safe barrier 22 includes the first terminal 18, the second terminal 20, the third terminal 24, the fourth terminal 26, a fuse 110, a zener diode 112 and a resistor 114. The first terminal 18 of the intrinsically safe barrier 22 and a first terminal 1100 of the fuse 110 are electrically connected. The fuse 110 of the intrinsically safe barrier 22 acts as a current limiter of the voltage across the zener diode 112. The fuse 110 will preferably "blowout" thus creating an open circuit between the first terminal 1100 and a second terminal 1102 of the fuse 110 if the voltage provided across the fuse 110 and the zener diode 112 exceeds a predetermined amount. The second terminal 1102 of the fuse 110, a cathode 1120 of the zener diode 112 and a first terminal 1140 of the resistor 114 are electrically connected to one another. A second terminal 1140 of the resistor 114 is electrically connected to the third terminal 24 of the intrinsically safe barrier 22. In addition, an anode 1122 of the zener diode 112, the second terminal 20 of the intrinsically safe barrier 22, and the fourth terminal 26 of the intrinsically safe barrier 22 are electrically connected. With this exemplary configuration, the intrinsically safe barrier 22 allows electrical power to be introduced into the protected area, while limiting power, current and voltage to particular levels so as to prevent the electric sparks.

In one exemplary embodiment of the present invention, the predetermined amount of voltage that would likely make the fuse 110 "blowout" is preferably smaller than the zener voltage of the zener diode 112, thereby protecting the zener diode 112 from experiencing an avalanche breakdown. In another exemplary embodiment of the present invention, the zener diode 22 has a zener voltage of, e.g., 18 V. The zener diode 112 and the resistor 114 operate to limit the voltage drop and current flow between the first terminals and the second terminals of the sensors of the sensor array 32 to a second predetermined amount and a third predetermined amount, respectively. In yet another exemplary embodiment of the present invention, the second predetermined amount for the first terminals of the sensors of the array 32 is, e.g., 18V and the third predetermined amount for the second terminals of the sensors of the sensor array 32 is, e.g., 120 mA. In a certain embodiment, the resistor 114 is a 100 Ω resistor.

Figure 4:
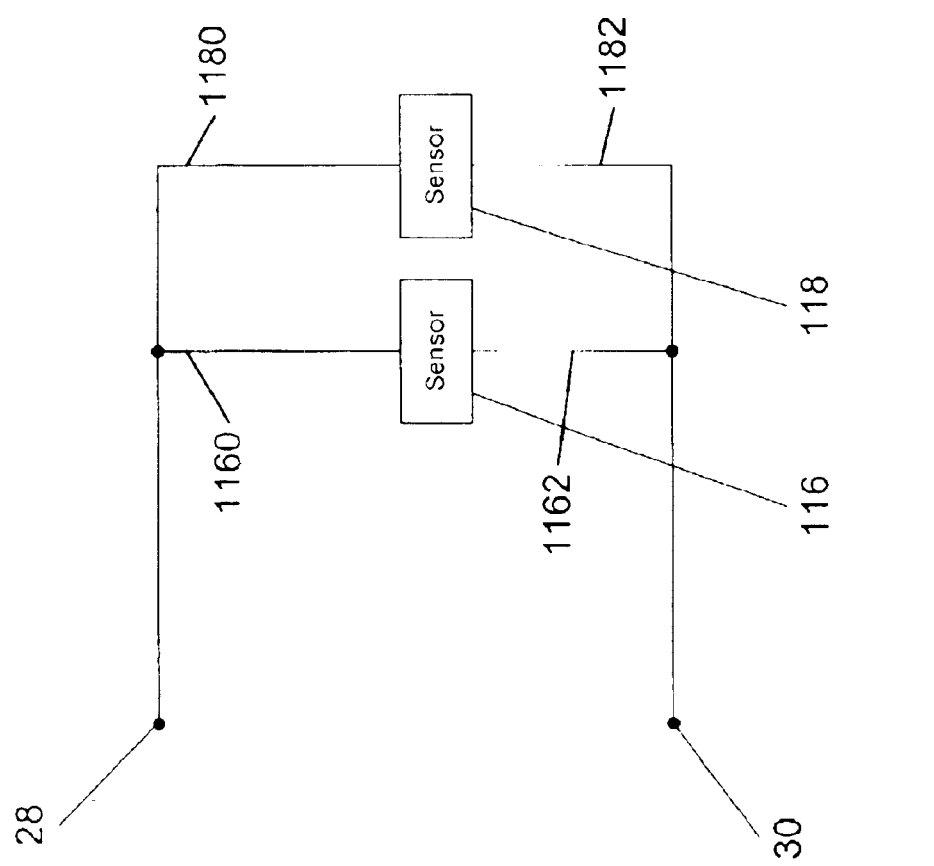
FIG. 4 is a circuit diagram of an exemplary embodiment of a sensor array of the measuring system of FIG. 1.

FIG. 4 shows a circuit diagram of an exemplary embodiment of the sensor array 32 of the present invention. The exemplary sensor array 32 includes the first terminal 28, the second terminal 30, a first sensor 116 and a second sensor 118. The first terminal 28 of the sensor array 32, a first terminal 1160 of the first sensor 116 and a first terminal 1180 of the second sensor 118 are electrically connected to one another. In addition, the second terminal 30 of the sensor array 32, a second terminal 1162 of the sensor 116 and a second terminal 1182 of the sensor 118 are electrically connected to one another. The first and second sensors 116, 118 of the sensor array 32 communicate with the processor 108 of the communication and control logic assembly 12 by utilizing a particular communications protocol which is compatible for each such device. Although the first and second sensors 116, 118 of the sensor array 32 are located in the unprotected or hazardous area, and the processor 108 is provided in the protected or safe area, the first and second sensors 116, 118 can communicate with the processor 108 using such particular communications protocol via the intrinsically safe barrier 22.

The measuring system 10 can be galvanically isolated, such that no ground is needed or provided at any portion thereof. By omitting the ground from the measuring system 10, the processor 108 can draw power from the transformer 102, and communicate with the first and second sensors 116, 118 of the sensor array 32. Additionally, the transformer 102, the capacitor 104, the diode 106, the processor 108, the fuse 110, the zener diode 112 and the resistor 114 can all be situated in a single enclosure to minimize the size of the entire measuring system 10.

Figure 5:
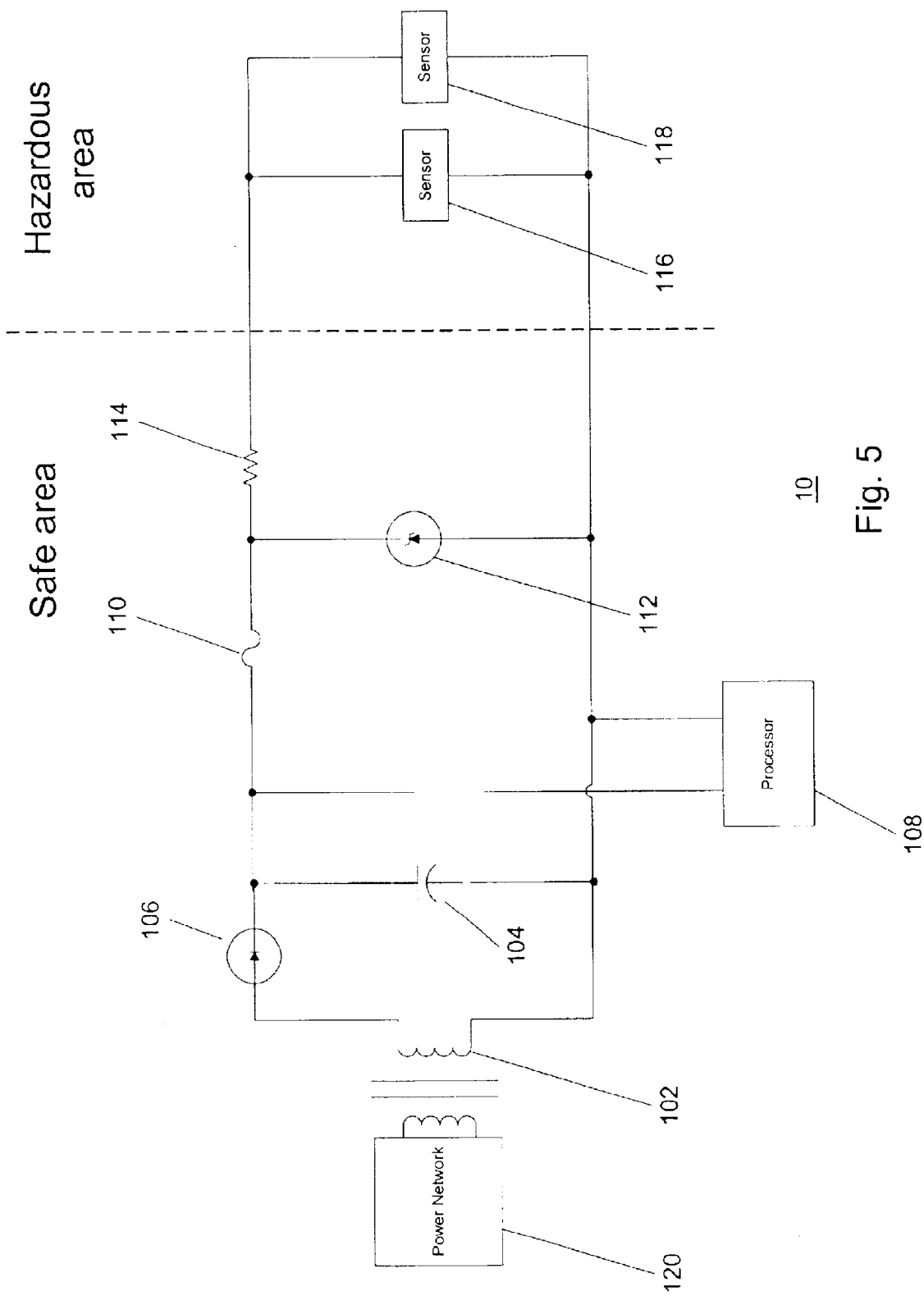
FIG. 5 is a circuit diagram of a second exemplary embodiment of a measuring system according to the present invention.

FIG. 5 illustrates a circuit diagram of a second exemplary embodiment of the measuring system 10 according to the present invention. For example, this measuring system 10 can be a circuit diagram version of the measuring system 10 of FIG. 1. The differences between the measuring system illustrated in FIG. 5 and the measuring system 10 as shown in FIG. 1 are that the terminals 14, 16, 18, 20, 24, 26, 28 and 30 are omitted from the measuring system 10 as shown in FIG. 5 for the sake of simplicity. However, it is within the scope of the present invention for this second exemplary embodiment of the measuring system 10 to include additional components (e.g., fuses) so as to reduce the possibility of overloading the barrier 22 and/or the sensors. As described above, the capacitor 104 (and the diode 106) can be thought of as forming a power arrangement which is directly connected to the processor 108 and to the intrinsically safe barrier 22.

Figure 6:
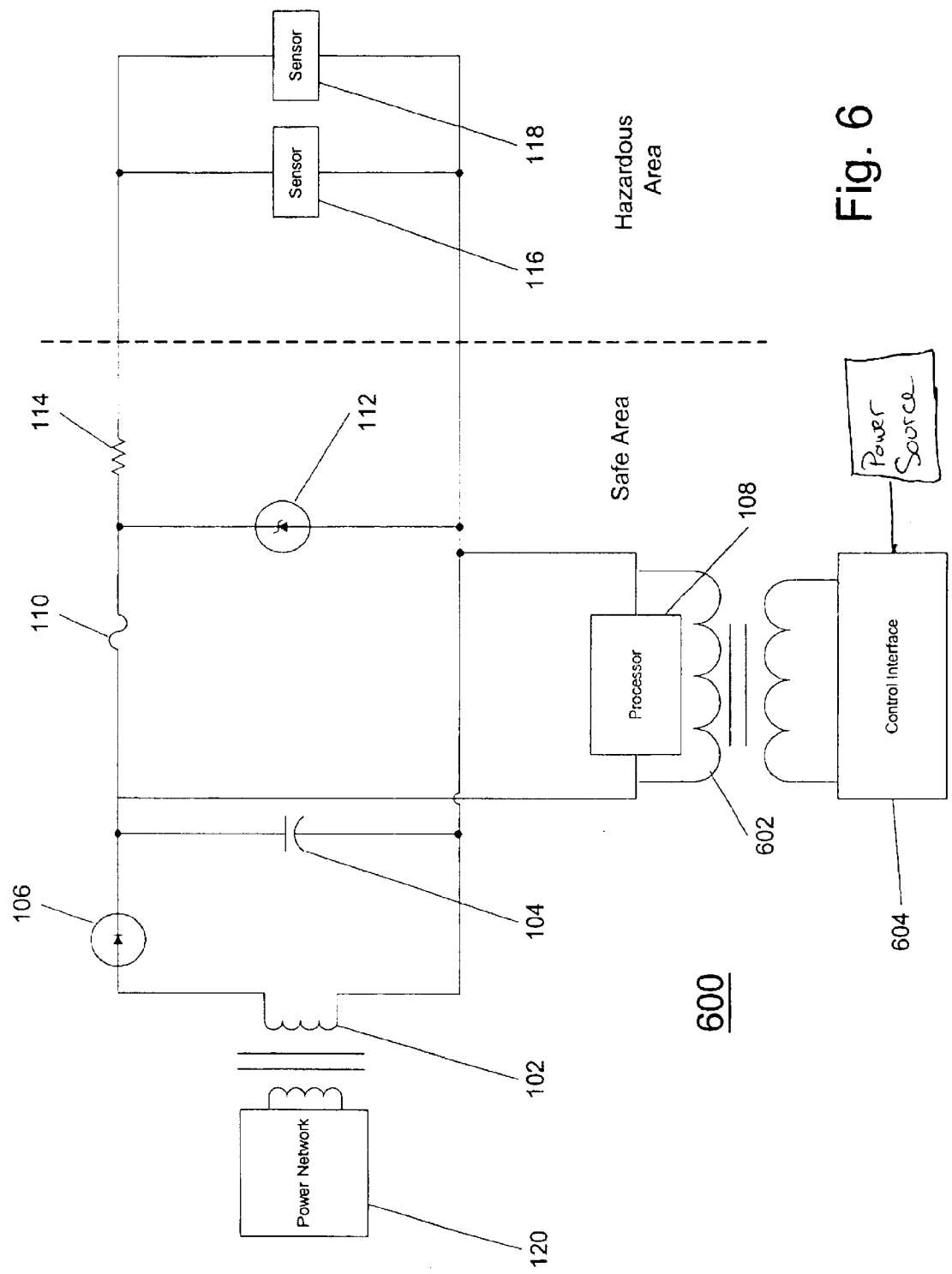
FIG. 6 is a circuit diagram of a third exemplary embodiment of a measuring system according to the present invention.

FIG. 6 illustrates a third exemplary embodiment of a measuring system 600 according to the present invention which is substantially similar to the second embodiment of the measuring system 10 shown in FIG. 5. The differences between the measuring system 600 shown in FIG. 6 and the measuring system 10 shown in FIG. 5 is that the exemplary measuring system 600 includes a transformer 602 and a control interface 604. One side of the transformer 602 is connected in parallel with the processor 108 and the intrinsically safe barrier 22. The other side of the transformer 602 is connected in parallel to the control interface 604. In this exemplary system 600, the transformer 602 electrically isolates the control interface 604 from the rest of the measuring system 600, and the control interface 604 allows the user thereof to control the sensors 116, 118 located in the sensor array 32 from an electrically isolated location. Preferably, the control interface 604 receives the readings from the sensors 116, 118 of the sensor array 32 after the readings from the sensors 116, 118 of the sensor array 32 have been aggregated by the processor 108.

The control interface 604 of the exemplary measuring system 600 shown in FIG. 6 also transmits commands to the sensors 116, 118 of the sensor array 32. This control interface 604 can utilize a particular communications protocol (which is known to those having ordinary skill in the art) to transmit commands for the sensors 116, 118 to the processor 108, which in turn sends the commands to the sensors 116, 118 of the sensor array 32. In another embodiment of the measuring device 600 of the present invention, the communications protocol is Fieldbus protocol. In yet another embodiment of the present invention, the communications protocol is HART® protocol. In still another certain embodiment, the communications protocol is PROFIBUS® protocol. In a further embodiment of the measuring device 600, the control interface 604 transmits commands directly to the sensors 116, 118, thus circumventing the processor 108.

While the invention has been described in connecting with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It is intended that the specification and the described examples are considered as exemplary only, with the true scope and spirit of the invention indicated by the following claims.

What is claimed:

1. A system for measuring at least one of a parameter and variable, comprising:

a control logic arrangement powered by a power source; and an intrinsically safe barrier operatively connected to the control logic arrangement, and powered by the power source, wherein the intrinsically safe barrier is adapted to be operatively connected to at least one sensor, wherein the sensor is powered by the power source, wherein the sensor is configured to communicate data representing the at least one of the parameter and the variable to the control logic arrangement via the intrinsically safe barrier, and wherein the power source is directly connected to the control logic arrangement and the intrinsically safe barrier, and wherein the control logic arrangement includes:

a further transformer having a first terminal, a second terminal, a third terminal, and a fourth terminal, wherein the further transformer is electrically connected to the processor, and a control interface electrically connected to the further transformer, wherein the control interface is configured to receive data representing the parameter from the control logic arrangement, and wherein the control interface transmits commands to the sensor via the control logic arrangement.

2. The system via the intrinsically safe barrier according to claim 1, further comprising a control interface powered by a further power source, wherein the control interface is configured to receive data representative of the parameter from the control logic arrangement.

3. The system according to claim 2, wherein the control interface transmits commands to the sensor via the control logic arrangement.

4. The system according to claim 3, wherein the control logic arrangement transmits the commands received from the control interface to the sensor via the intrinsically safe barrier.

5. The system according to claim 2, wherein the control interface transmits commands to the sensor via the intrinsically safe barrier.

6. The system according to claim 1, further comprising a control interface powered by a further power source, wherein the control interface is configured to receive data representing the parameter from the control logic arrangement, and wherein the control interface is configured to transmit commands directly to the sensor.

7. The system according to claim 1, wherein the control logic arrangement includes:
   a transformer having a positive terminal and a negative terminal,
   a capacitor having a first terminal and a second terminal,
   a diode having a cathode and an anode, wherein the anode is electrically connected to the positive terminal of the transformer and the first terminal of the capacitor, and
   a processor electrically connected to the cathode of the diode, and electrically connected to negative terminal of the transformer and the second terminal of the capacitor.

8. The system according to claim 1, wherein the data representing the process parameter received by the control logic arrangement from the sensor is digital data.

9. The system according to claim 1, wherein the data representing the process parameter received by the control logic arrangement from the sensor is transmitted using a communications protocol.

10. The system according to claim 1, wherein the intrinsically safe barrier electrically isolates the sensor from the control logic arrangement.

11. The system according to claim 10, wherein the intrinsically safe barrier limits the voltage differential over the sensor to a particular limit.

12. The system according to claim 11, wherein the particular limit is approximately 18 V.

13. The system according to claim 12, wherein the intrinsically safe barrier limits the amount of current provided to the sensor to a particular current amount.

14. The system according to claim 13, wherein the particular current amount is approximately 120 mA.

15. The system according to claim 1, wherein the intrinsically safe barrier includes:
   a fuse,
   a zener diode having a cathode and an anode, and
   a resistor having a first terminal and a second terminal, wherein the first terminal of the resistor is electrically connected to the cathode of the zener diode and the fuse.

16. The system according to claim 1, further comprising an enclosure, wherein the control logic arrangement and the intrinsically safe barrier are located within the enclosure.

17. The system according to claim 1, wherein the control logic arrangement, the intrinsically safe barrier and the sensor are galvanically isolated from external components.

18. The system according to claim 1, wherein the intrinsically safe barrier is further adapted to be operatively connected to a second sensor, and wherein the second sensor is powered by the power source and configured to transmit data representing a further parameter via the intrinsically safe barrier to the control logic arrangement.

19. The system according to claim 18, wherein the data representative of the second parameter received by the control logic arrangement from the second sensor is digital data.

20. The system according to claim 18, wherein the data representative of the second parameter received by the control logic arrangement from the second sensor is transmitted using a communications protocol.

21. The system according to claim 20, wherein the communications protocol is a Fieldbus protocol.

22. A The system for measuring at least one of a parameter and variable, comprising:
   a control logic arrangement powered by a power source; and
   an intrinsically safe barrier operatively connected to the control logic arrangement, and powered by the power source, wherein the intrinsically safe barrier is adapted to be operatively connected to at least one sensor, wherein the sensor is powered by the power source, wherein the sensor is configured to communicate data representing the at least one of the parameter and the variable to the control logic arrangement via the intrinsically safe barrier, wherein the power source is directly connected to the control logic arrangement and the intrinsically safe barrier, and wherein the data representing the process parameter received by the control logic arrangement from the sensor is transmitted using a Fieldbus protocol.

23. A system for measuring at least one of a parameter and a variable, comprising:
   a control logic arrangement; and
   an intrinsically safe barrier operatively connected to the control logic arrangement, wherein the intrinsically safe barrier is adapted to be operatively connected to at least one sensor, wherein the sensor is configured to communicate data representing the at least one of the parameter and the variable to the control logic arrangement via the intrinsically safe barrier, and wherein the control logic arrangement, the intrinsically safe barrier and the sensor are galvanically isolated from external components.

24. The system according to claim 23, further comprising a control interface powered by a further power source, wherein the control interface is configured to receive data representative of the parameter from the control logic arrangement.

25. The system according to claim 24, wherein the control interface transmits commands to the sensor via the control logic arrangement.

26. The system according to claim 25, wherein the control logic arrangement transmits the commands received from the control interface to the sensor via the intrinsically safe barrier.

27. The system according to claim 24, wherein the control interface transmits commands to the sensor via the intrinsically safe barrier.

28. The system according to claim 23, further comprising a control interface powered by a further power source, wherein the control interface is configured to receive data representing the parameter from the control logic arrangement, and wherein the control interface is configured to transmit commands directly to the sensor.

29. The system according to claim 23, wherein the control logic arrangement includes:
   a transformer having a positive terminal and a negative terminal,
   a capacitor having a first terminal and a second terminal,
   a diode having a cathode and an anode, wherein the anode is electrically connected to the positive terminal of the transformer and the first terminal of the capacitor, and
   a processor electrically connected to the cathode of the diode, and electrically connected to negative terminal of the transformer and the second terminal of the capacitor.

30. The system according to claim 29, wherein the control logic arrangement further includes:
   a further transformer having a first terminal, a second terminal, a third terminal, and a fourth terminal, wherein the further transformer is electrically connected to the processor, and
   a control interface electrically connected to the further transformer, wherein the control interface is configured to receive data representing the parameter from the control logic arrangement, and wherein the control interface transmits commands to the sensor via the control logic arrangement.

31. The system according to claim 23, wherein the data representing the process parameter received by the control logic arrangement from the sensor is digital data.

32. The system according to claim 23, wherein the data representing the process parameter received by the control logic arrangement from the sensor is transmitted using a communications protocol.

33. The system according to claim 32, wherein the communications protocol is Fieldbus protocol.

34. The system according to claim 23, wherein the intrinsically safe barrier electrically isolates the sensor from the control logic arrangement.

35. The system according to claim 34, wherein the intrinsically safe barrier limits the voltage differential over the sensor to a particular limit.

36. The system according to claim 35, wherein the particular limit is approximately 18 V.

37. The system according to claim 36, wherein the intrinsically safe barrier limits the amount of current provided to the sensor to a particular current amount.

38. The system according to claim 37, wherein the particular current amount is approximately 120 mA.

39. The system according to claim 23, wherein the intrinsically safe barrier includes:
   a fuse,
   a zener diode having a cathode and an anode, and
   a resistor having a first terminal and a second terminal, wherein the first terminal of the resistor is electrically connected to the cathode of the zener diode and the fuse.

40. The system according to claim 23, comprising an enclosure, wherein the control logic arrangement and the intrinsically safe barrier are located within the enclosure.

41. The system according to claim 23, wherein the power source is directly connected to the control logic arrangement and the intrinsically safe barrier, wherein the intrinsically safe barrier is further adapted to be operatively connected to a second sensor, and wherein the second sensor is powered by the power source and configured to transmit data representing a further parameter via the intrinsically safe barrier to the control logic arrangement.

42. The system according to claim 41, wherein the data representative of the second parameter received by the control logic arrangement from the second sensor is digital data.

43. The system according to claim 41, wherein the data representative of the second parameter received by the control logic arrangement from the second sensor is transmitted using a communications protocol.

44. The system according to claim 43, wherein the communications protocol is a Fieldbus protocol.

45. A measuring system for measuring at least one of a parameter and a variable, comprising:
   an enclosure;
   a control logic arrangement located within the enclosure; and
   an intrinsically safe barrier operatively connected to the control logic arrangement and located within the enclosure, wherein the intrinsically safe barrier is adapted to be operatively connected to at least one sensor, wherein the sensor is configured to communicate data representing the at least one of the parameter and the variable to the control logic arrangement via the intrinsically safe barrier, and
   wherein the control logic arrangement includes:
   a further transformer having a first terminal, a second terminal, a third terminal, and a fourth terminal, wherein the further transformer is electrically connected to the processor, and
   a control interface electrically connected to the further transformer, wherein the control interface is configured to receive data representing the parameter from the control logic arrangement, and wherein the control interface transmits commands to the sensor via the control logic arrangement.

46. The system according to claim 45, further comprising a control interface powered by a further power source, wherein the control interface is configured to receive data representative of the parameter from the control logic arrangement.

47. The system according to claim 46, wherein the control interface transmits commands to the sensor via the control logic arrangement.

48. The system according to claim 47, wherein the control logic arrangement transmits the commands received from the control interface to the sensor via the intrinsically safe barrier.

49. The system according to claim 46, wherein the control interface transmits commands to the sensor via the intrinsically safe barrier.

50. The system according to claim 48, further comprising a control interface powered by a further power source, wherein the control interface is configured to receive data representing the parameter from the control logic arrangement, and wherein the control interface is configured to transmit commands directly to the sensor.

51. The system according to claim 45, wherein the control logic arrangement includes:
   a transformer having a positive terminal and a negative terminal,
   a capacitor having a first terminal and a second terminal,
   a diode having a cathode and an anode, wherein the anode is electrically connected to the positive terminal of the transformer and the first terminal of the capacitor, and a processor electrically connected to the cathode of the diode, and electrically connected to negative terminal of the transformer and the second terminal of the capacitor.

52. The system according to claim 45, wherein the data representing the process parameter received by the control logic arrangement from the sensor is digital data.

53. The system according to claim 45, wherein the data representing the process parameter received by the control logic arrangement from the sensor is transmitted using a communications protocol.

54. The system according to claim 53, wherein the communications protocol is Fieldbus protocol.

55. The system according to claim 45, wherein the intrinsically safe barrier electrically isolates the sensor from the control logic arrangement.

56. The system according to claim 55, wherein the intrinsically safe barrier limits the voltage differential over the sensor to a particular limit.

57. The system according to claim 56, wherein the particular limit is approximately 18 V.

58. The system according to claim 57, wherein the intrinsically safe barrier limits the amount of current provided to the sensor to a particular current amount.

59. The system according to claim 58, wherein the particular current amount is approximately 120 mA.

60. The system according to claim 45, wherein the intrinsically safe barrier includes:
a fuse,
a zener diode having a cathode and an anode, and
a resistor having a first terminal and a second terminal, wherein the first terminal of the resistor is electrically connected to the cathode of the zener diode and the fuse.

61. The system according to claim 45, further comprising an enclosure, wherein the control logic arrangement and the intrinsically safe barrier are located within the enclosure.

62. The system according to claim 45, wherein the power source is directly connected to the control logic arrangement and the intrinsically safe barrier, wherein the intrinsically safe barrier is further adapted to be operatively connected to a second sensor, and wherein the second sensor is powered by the power source and configured to transmit data representing a further parameter via the intrinsically safe barrier to the control logic arrangement.

63. The system according to claim 62, wherein the data representative of the second parameter received by the control logic arrangement from the second sensor is digital data.

64. The system according to claim 62, wherein the data representative of the second parameter received by the control logic arrangement from the second sensor is transmitted using a communications protocol.

65. The system according to claim 64, wherein the communications protocol is a Fieldbus protocol.

66. The system according to claim 45, wherein the control logic arrangement, the intrinsically safe barrier and the sensor are galvanically isolated from external components.

67. A system for measuring at least one of a parameter and variable, comprising:
a control logic arrangement powered by a power source, wherein the control logic arrangement includes a control interface electrically isolated from the control logic arrangement and configured to receive data representing the parameter from the control logic arrangement; and
an intrinsically safe barrier operatively connected to the control logic arrangement, and powered by the power source, wherein the intrinsically safe barrier is adapted to be operatively connected to at least one sensor, wherein the sensor is powered by the power source, wherein the sensor is configured to communicate data representing the at least one of the parameter and the variable to the control logic arrangement via the intrinsically safe barrier, and wherein the power source is directly connected to the control logic arrangement and the intrinsically safe barrier.

68. The system of claim 67, wherein the control interface is electronically isolated from the control logic arrangement by a transformer.

* * * * *

UNITED STATES PATENT AND TRADEMARK OFFICE
CERTIFICATE OF CORRECTION

PATENT NO. : 6,885,949 B2 Page 1 of 1
DATED : April 26, 2005
INVENTOR(S) : Basilio Selli It is certified that error appears in the above-identified patent and that said Letters Patent is hereby corrected as shown below:

Column 1,
Line 22, "gassers" should read -- gasses --.
Line 66, "system-via" should read -- system via --.

Column 3,
Line 25, "galvanically" should read -- galvonically --.

Column 4,
Line 34, "galvanically" should read -- galvonically --.

Column 7,
Line 41, "galvanically" should read -- galvonically --.

Column 8,
Line 62, "barrier, and wherein" should read -- barrier, wherein --.

Column 10,
Line 22, "A The system" should read -- A system --.

Column 11,
Line 62, "claim 23, comprising" should read -- claim 23, further comprising --.

Column 12,
Line 54, "claim 48" should read -- claim 45 --.

Signed and Sealed this

Thirteenth Day of September, 2005

JON W. DUDAS
*Director of the United States Patent and Trademark Office*

UNITED STATES PATENT AND TRADEMARK OFFICE
CERTIFICATE OF CORRECTION

PATENT NO. : 6,885,949 B2
DATED : April 26, 2005
INVENTOR(S) : Basilio Selli

It is certified that error appears in the above-identified patent and that said Letters Patent is hereby corrected as shown below:

Title page,
Item [56], References Cited, U.S. PATENT DOCUMENTS, add:
-- 3,997,733   12/1976   Sanders
   6,044,714   04/2000   Lowell et al.
   6,397,322   05/2002   Voss
   3,818,273   06/1974   Nakashima et al.
   5,835,534   11/1998   Kogure
   3,973,170   08/1976   Hogan
   6,233,285   05/2001   Beaudoin et al.
   6,154,683   11/2000   Kessler et al.
   5,144,517   09/1992   Wieth --.

Signed and Sealed this

Third Day of January, 2006

JON W. DUDAS
*Director of the United States Patent and Trademark Office*